United States Patent Office 3,627,539
Patented Dec. 14, 1971

3,627,539
YEAST CONDIMENT CONTAINING ADDED METHIONINE
Kiyofumi Ishii, Ikeda, Jun Toda, Nishinomiya, and Hisashi Aoki, Suita, Japan, assignors to Takeda Chemical Industries, Ltd., Osaka, Japan
No Drawing. Filed May 6, 1968, Ser. No. 727,035
Claims priority, application Japan, May 8, 1967, 42/29,065
Int. Cl. A23j 1/18; A23l 1/22
U.S. Cl. 99—140 N    8 Claims

ABSTRACT OF THE DISCLOSURE

Disagreeable odor and taste characteristic of a yeast condiment such as yeast extract, yeast hydrolyzate, yeast autolyzate are remarkably suppressed, so that flavor of such yeast condiment is considerably improved by incorporating thereinto methionine in an amount to provide from about 1 to 30% by weight relative to the weight on the dry basis of the said yeast condiment.

---

This invention relates to a seasoning composition comprising a yeast condiment as a seasoning ingredient. More particularly, this invention relates to a seasoning composition comprising both (A) a yeast condiment such as yeast extract, yeast hydrolyzate, yeast autolyzate and (B) methionine.

Yeast condiments, i.e. yeast extract, yeast hydrolyzate and yeast autolyzate have practically been employed for the purpose of improving or enhancing flavor of foods or beverages because not only do they possess a strong flavor they are rich in amino acids. However, since such yeast condiments are inevitably bound up with some disagreeable odor or taste, they are not universally acceptable as seasoning ingredients. How to suppress the disagreeable odor or taste of such a yeast condiment, so that it exerts an acceptable, mild and pleasing flavor, has been a long-standing problem in the field of food industry.

The present invention is addresssed to solving the said problem. The problem has been solved according to the invention by incorporating a specified amount of methionine into a yeast condiment which is generally accompanied by a disagreeable odor or taste, the resultant product having the ability of considerably enhancing or improving the flavor of foods and beverages but being free of the disagreeable odor or taste characteristic of such a yeast condiment.

In one aspect thereof, the present invention thus provides a seasoning composition comprising a yeast condiment, the composition being free of the disagreeable odor or taste characteristic of such a yeast condiment. Another object of the present invention is to provide a method for the preparation of the said seasoning composition. Further object of the present invention is to provide a method for remarkably enhancing or improving flavor of foods and beverages with the employment of the said seasoning composition.

The method of this invention is applicable to all available yeast condiments which are accompanied by a disagreeable odor or taste.

Thus, the invention is applicable to yeast extracts, yeast hydrolyzates or yeast autolyzates which are prepared by per se conventional processes. For example, the present invention is applicable to yeast extracts prepared by processes comprising extracting yeast with water or water-containing solvent on heating, yeast hydrolyzates prepared by processes comprising hydrolyzing yeast with a suitable acid such as hydrochloric acid, yeast autolyzates prepared by processes which comprise subjecting yeast to autolysis under suitable conditions, e.g. employing a salt such as sodium chloride or an organic solvent such as amyl alcohol, ethyl acetate, etc. These yeast extracts, yeast hydrolyzates and yeast autolyzates may be prepared from any yeast, for instance, the yeast condiments to be employed in the present invention may be yeast extracts, yeast hydrolyzate, yeast autolyzates originating from baker's yeast such as *Saccharomyces cerevisiae*, brewer's yeast such as *Saccharomyces cerevisiae* or food yeasts such as *Candida utilis*. These yeast condiments may be those which are decolorized or purified with the employment of activated charcoal or ion exchange resins.

Methionine employable according to the present invention may be L-methionine, D-methionine or DL-methionine.

As stated, the present invention makes it possible effectively to lessen or substantially suppress the disagreeable odor or taste of a yeast condiment by incorporating methionine thereinto. Furthermore, whereas methionine itself is well known to have an objectionable taste as well as a repulsive odor characteristic of sulfur, the said uncomfortable odor and taste of methionine is at the same time also suppressed when it is incorporated with the yeast condiment. The amount of methionine to be added ranges from about 1 to about 30% by weight relative to the weight on the dry basis of the yeast condiment. When an excess of methionine is incorporated into the yeast condiment, the resultant composition will be accompanied by the unpleasant odor and taste of methionine, whereas no satisfactory result in suppressing the disagreeable odor and flavor can be expected when less than 1% of methionine is incorporated. In general, incorporation of methionine into the yeast condiment in an amount to provide about 2 to about 15% by weight relative to the weight on the dry basis of the yeast condiment gives best results.

Incorporation of methionine into the yeast condiment according to this invention can be effected merely by mixing them. The admixed materials can be in the form of powder or paste.

Thus-obtained seasoning composition is applicable to any kind of food and beverage to which conventional yeast condiments are applicable. Such foods and beverages may be exemplified by paste such as ham, sausage, steamed fish paste (Kamoboko or Chikuwa), noodles such as macaroni, seasonings such as sauce, ketchup, mayonnaise sauce, dressing, milk and its processed matter such as cow's milk, condensed milk, cheese, processed vegetable such as tomato juice, canned spinach, cooked foods such as soups, stew, etc. These foods and beverages can be enhanced or improved in their flavor without collateral diasgreeable odor and taste characteristic of conventional yeast condiments by adding thereto the seasoning composition of the present invention.

It is also within the scope of the present invention to incorporate severally the yeast condiment and methionine into foods or beverages to be enhanced or improved in their flavor.

The seasoning composition of the present invention may contain other seasoning ingredient(s) than the yeast condiment. Examples of such seasoning ingredients are hydrolyzed vegetable protein and 5'-nucleotide.

The hydrolyzed vegetable protein may be any one which is prepared by acid, enzymatic or other hydrolysis of vegetable proteins such as those existing in cereal grains, e.g. wheat. Incorporation of the said hydrolyzed vegetable protein in the mixture of the yeast condiment and methionine gives the seasoning composition well-balanced and thick flavor. The amount of the hydrolyzed vegetable protein to be added to the mixture of the yeast condiment and methionine ranges from about 0.5 to about 5 parts by weight per part of the yeast condiment when these ingredients are calculated on the dry basis.

As the 5'-nucleotide, there may be employed 5'-inosinic acid, 5'-guanylic acid, their physiologically acceptable salts such as alkali metal salts and alkaline earth metal salts, and mixture thereof. Incorporation of the said 5'-nucleotide imparts to the present seasoning composition the ability of further improving or enhancing the flavor of foods and beverages. From both the viewpoint of the balance in flavor of the objective seasoning composition and the economic advantage of the present seasoning composition, it is preferable to incorporate the 5'-nucleotide in an amount to provide from about 1 to about 5% by weight relative to the weight on the dry basis of the yeast condiment contained in the present seasoning composition.

In the following examples "part" means part by weight on the dry basis, and yeast extract, yeast hydrolyzate and yeast autolyzate employed in the following tests and examples are those which are prepared by the following processes:

Yeast extract employed in Tests 1 to 4 and Example 1

20 kilograms of dried cells of food yeast (e.g. *Candida utilis* NRRL, Y-0900) is suspended in 60 kilograms of water. The suspension is adjusted to pH 3.5 with hydrochloric acid, and is kept standing at 40° C. for 3 hours. The resultant is subjected to centrifugation. The supernatant is adjusted to pH 5.5 with sodium hydroxide, and is subjected to spray-drying to give powdered yeast extract.

Yeast hydrolyzate employed in Example 3

20 kilograms of dried cells of food yeast (e.g. *Candida utilis* NRRL, Y-0900) is suspended in 50 kilograms of 10% hydrochloric acid solution and the mixture is boiled for 20 hours. The resultant is adjusted to pH 5.5 with sodium hydroxide, is decolorized by treatment with activated charcoal and is subjected to filtration employing a so-called filter press. The filtrate is subjected to spray-drying to give powdered yeast hydrolyzate.

Yeast autolyzate employed in Example 2

20 kilograms (on the dry basis) of baker's yeast (e.g. *Saccharomyces cerevisiae* NRRL, Y-977) is washed with water and is suspended in 80 liters of water. The suspension is adjusted to pH 8.0 with sodium carbonate. The suspension is stirred and to it is added ethyl acetate so as to make its concentration 1% relative to the total weight. The suspension is kept standing at 37° C. for 5 hours, whereby autolysis of the yeast takes place. The resultant is subjected to centrifugation, and the supernatant is concentrated under reduced pressure to make the concentration of the resulting solid part 25% by weight, and is subjected to spray-drying to give powdered yeast autolyzate.

TEST 1

Yeast extract and DL-methionine were dissolved in hot water at the following concentrations, and panelists were served with the solutions at a temperature ranging from 60° to 65° C.

The results are summarized in Table 1.

TABLE 1

| Sample | Concentrations relative to the total solution percent | | Percent of DL-methionine [1] | Degree of improvement [2] | Remarks |
| --- | --- | --- | --- | --- | --- |
| | Yeast extract | DL-methionine | | | |
| 1 | 0.1 | 0.01 | 10 | + * | Disagreeable odor of yeast extract suppressed, and a well-balanced flavor developed. |
| 2 | 0.1 | 0.03 | 30 | + * | Do. |
| 3 | 0.5 | 0.001 | 0.2 | ([3]) | |
| 4 | 0.5 | 0.01 | 2 | + + * * | Disagreeable odor of yeast extract suppressed, and a well-balanced and thick flavor developed. |
| 5 | 0.5 | 0.05 | 10 | + + * * | Disagreeable odor of yeast extract suppressed, and a well-balanced and thick flavor as well as a good after-taste developed. |
| 6 | 0.5 | 0.1 | 20 | + * | Disagreeable odor of yeast extract suppressed, and a well-balanced flavor as well zs a good after-taste developed Mild sweetness. |
| 7 | 0.5 | 0.175 | 35 | ([3]) | Disagreeable odor of yeast extract suppressed, but sweetness flavor due to DL-methionine was appreciated |

[1] Relative to the weight of yeast extract on the dry basis.
[2] Relative to the control sample containing only yeast extract.
[3] Not improved.
NOTE.— + *=Fairly improved; + + * *=Remarkably improved.

TEST 2

Panel test was carried out using D-methionine and a 0.5% yeast extract solution after the manner described in Test 1. The results are summarized in Table 2.

TABLE 2

| Sample | Conditions of— | Percent of added D-methionine [1] | Results |
| --- | --- | --- | --- |
| 1 | Dissolved in hot water. | 2 | Compared with the sample. [2] |
| 2 | Boiled for 3 minutes after dissolution. | 2 | More remarkable improvement than above. |

[1] Relative to the yeast extract on the dry basis.
[2] Containing only yeast extract, the disagreeable odor of yeast extract lessened.

TEST 3

Panel test was carried out using L-methionine and a 0.5% yeast extract solution after the manner described in Test 1. The results are summarized in Table 3.

TABLE 3

| Sample Number | Percent of added L-methionine [1] | Results |
| --- | --- | --- |
| 1 | 2 | Improved, the disagreeable flavor of yeast extract suppressed. |
| 2 | 15 | Slightly bitter taste appeared but the disagreeable odor of yeast extract suppressed. |

[1] Relative to the yeast extract on the dry basis.

TEST 4

Sample A: Basic admixture consisting of 1.7 grams of table salt, 0.8 gram of sugar, 5.5 grams of skimmed milk powder, 8 grams of roux, 0.4 gram of monosodium glutamate, 0.2 gram of onion powder, 0.4 gram of shortening, 0.02 gram of turmeric and 0.03 gram of black pepper.

Sample B: Sample A plus 0.1 gram of yeast extract.

Sample C: Sample A plus 0.1 gram of yeast extract and 0.01 gram of DL-methionine.

Sample D. Sample A plus 0.1 gram of yeast extract and 0.05 gram of DL-methionine.

Samples A through D are respectively added to 180 milliliters of water and each mixture is boiled for 3 minutes to prepare cream soup.

Panel tests were carried out using thus-obtained cream soup by the rank order method (Panel: 6 members). The results are summarized in Table 4.

TABLE 4

| Sample | A | B | C | D |
|---|---|---|---|---|
| Number of persons who gave the first rank | 0 | 2 | 4 | 3 |
| Number of persons who gave the second rank | 1 | 3 | 2 | 1 |
| Number of persons who gave the third rank | 3 | 0 | 0 | 3 |
| Number of persons who gave the fourth rank | 2 | 1 | 0 | 0 |
| Rank sum | 19 | 12 | 8 | 20 |

It is clear from Table 3 that when yeast extract is employed in combination with 10% of DL-methionine relative to the yeast extract, the flavor of cream soup is considerably improved further than when only yeast extract is added to cream soup, and that incorporation of DL-methionine in an amount to provide 50% relative to the yeast extract gives undesirable results.

Example 1

100 parts of powdered yeast extract is homogeneously admixed with 4 parts of DL-methionine to give a seasoning composition.

When triangle difference tests are used between a sample prepared by dissolving the said seasoning composition in hot water so as to make its concentration 0.52% by weight and the control prepared by dissolving only the yeast extract in hot water in the same concentration as above, 7 out of 10 persons correctly identified the odd sample (significant at 5% level), and it is recognized that disagreeable odor is apparently suppressed in the sample as compared with the control sample and pleasing aroma and well-balanced flavor of the sample are remarkable further than those of the control sample.

Example 2

50 parts of powdered yeast autolyzate, 46 parts of hydrolyzed vegetable protein, 0.5 part of disodium 5′-inosinsuccinate and 2 parts of DL-methionine are homogeneously mingled to give a seasoning composition. Thus-prepared seasoning composition is characterized by high ability of enhancing and improving the flavor of clear soup with its addition thereto at a range of 0.1 to 0.3% by weight without giving disagreeable odor or taste characteristic of the yeast autolyzate.

Example 3

100 parts of yeast hydrolyzate is homogeneously admixed with 5 parts of L-methionine to give a seasoning composition. This composition is characterized by high ability of enhancing and improving the flavor of curry soup with its addition thereto at a range of 0.1 to 0.5% by weight without giving disagreeable odor or taste characteristic of the yeast hydrolyzate.

Where, in the foregoing, reference is made to particular yeast strains, it is not intended that the invention be restricted to those NRRL strains mentioned, solely by way of example; yeast autolyzates originating from any other strain of *Saccharomyces cerevisiae, Candida utilis*, etc. may equally as well be used.

Having thus disclosed the invention, what is claimed is:

1. A seasoning composition consisting essentially of (a) a yeast condiment selected from the group consisting of yeast extract, yeast hydrolyzate, yeast autolyzate and a mixture thereof, and (b) methionine, apart from any methionine in the yeast condiment, in an amount of from about 1 to about 30% by weight relative to the weight on the dry basis of the said yeast condiment.

2. A seasoning composition as claimed in claim 1, wherein the amount of methionine, apart from any methionine in the yeast condiment, is about 2 to about 15% by weight relative to the weight on the dry basis of the yeast condiment.

3. A seasoning composition consisting essentially of (a) a yeast condiment selected from the group consisting of yeast extract, yeast hydrolyzate, yeast autolyzate and a mixture thereof, (b) methionine, apart from any methionine in the yeast condiment, in an amount of from about 1 to about 30% by weight relative to the weight on the dry basis of the said yeast condiment, and (c) hydrolyzed vegetable protein in an amount on the dry basis of from about 0.5 to about 5 parts by weight per part of the yeast condiment.

4. A seasoning composition consisting essentially of (a) a yeast condiment selected from the group consisting of yeast extract, yeast hydrolyzate, yeast autolyzate and a mixture thereof, (b) methionine, apart from any methionine in the yeast condiment, in an amount of from about 1 to about 30% by weight relative to the weight on the dry basis of the said yeast condiment, (c) hydrolyzed vegetable protein in an amount of from about 0.5 to about 5 parts by weight on the dry basis per part of the yeast condiment, and (d) a 5′-nucleotide selected from the group consisting of 5′-inosinic acid, 5′-guanylic acid, a physiologically acceptable salt thereof and a mixture thereof in an amount of from about 1 to about 5% by weight relative to the weight on the dry basis of the yeast condiment.

5. In a method for improving or enhancing flavor of foods or beverages by the addition thereto of a yeast condiment selected from the group consisting of yeast extract, yeast hydrolyzate, yeast autolyzate and a mixture thereof, the improvement wherein methionine is added into the foods or beverages as the sole additional component in an amount to provide from about 1 to about 30% relative to the weight on the dry basis of the yeast condiment.

6. The improvement as claimed in claim 5, wherein the amount of methionine is from about 2 to about 15% relative to the weight on the dry basis of the said yeast condiment.

7. In a method for improving or enhancing flavor of foods or beverages by the addition thereto of a yeast condiment selected from the group consisting of yeast extract, yeast hydrolyzate, yeast autolyzate and a mixture thereof, the improvement wherein methionine is added into the foods or beverages as the sole additional component in an amount to provide from about 1 to about 30% relative to the weight on the dry basis of the yeast condiment, and hydrolyzed vegetable protein is incorporated into the resultant mixture in an amount to provide from about 0.5 to about 5 parts by weight on the dry basis per part of the yeast condiment.

8. In a method for improving or enhancing flavor of foods or beverages by the addition thereto of a yeast condiment selected from the group consisting of yeast extract, yeast hydrolyzate, yeast autolyzate and a mixture thereof, the improvement wherein methionine is added into the foods or beverages as the sole additional component in an amount to provide from about 1 to about 30% relative to the weight on the dry basis of the yeast condiment, and a 5′-nucleotide selected from the group consisting of 5′-inosinic acid, 5′-guanylic acid, a physiologically acceptable salt thereof and a mixture thereof is incorporated into the resultant mixture in an amount to provide from about 1 to about 5% by weight relative to the weight on the dry basis of the said yeast condiment.

References Cited

UNITED STATES PATENTS 2,999,753  9/1961  Witwicka et al. _____ 99—97 X

FOREIGN PATENTS 632,791  12/1961  Canada.

JOSEPH SCOVRONEK, Primary Examiner

W. BOVEE, Assistant Examiner

U.S. Cl. X.R.

99—97